United States Patent

Friedrich et al.

[11] Patent Number: 6,026,862
[45] Date of Patent: Feb. 22, 2000

[54] DOUBLE CONTAINMENT PIPE SECTIONS

[75] Inventors: Ralph S. Friedrich, Hermosa Beach, Calif.; Joie L. Folkers; Brian M. Francis, both of Wichita Falls, Tex.

[73] Assignee: Ameron International Corporation, Pasadena, Calif.

[21] Appl. No.: 08/806,123

[22] Filed: Feb. 14, 1997

[51] Int. Cl.$^7$ ...................................................... F16L 9/18
[52] U.S. Cl. .......................... 138/112; 138/113; 138/123; 138/146; 138/104
[58] Field of Search ...................................... 138/112, 111, 138/123, 113, 146, 149, 104

[56] References Cited

U.S. PATENT DOCUMENTS

| | | | |
|---|---|---|---|
| 530,951 | 12/1894 | La Pointe et al. | 138/111 |
| 2,676,773 | 4/1954 | Sanz et al. | 138/149 |
| 3,197,379 | 7/1965 | Alfille et al. | |
| 3,289,703 | 12/1966 | Brown | 138/149 |
| 3,299,417 | 1/1967 | Sibthorpe . | |
| 3,372,715 | 3/1968 | Ashton . | |
| 3,473,575 | 10/1969 | Vogelsang et al. | 138/149 |
| 3,563,825 | 2/1971 | Segura et al. | 138/149 |
| 3,930,568 | 1/1976 | Levey | 138/149 |
| 3,945,867 | 3/1976 | Heller, Jr. et al. | 138/123 |
| 3,948,292 | 4/1976 | Goto et al. . | |
| 4,029,889 | 6/1977 | Mizuochi . | |
| 4,259,990 | 4/1981 | Rohner . | |
| 4,410,013 | 10/1983 | Sasaki et al. | 138/114 |
| 4,667,505 | 5/1987 | Sharp . | |
| 4,759,994 | 7/1988 | Lesourd . | |
| 4,915,121 | 4/1990 | Rains . | |
| 5,127,441 | 7/1992 | Rains . | |
| 5,267,670 | 12/1993 | Foster . | |
| 5,343,738 | 9/1994 | Skaggs . | |
| 5,478,171 | 12/1995 | Tassone et al. . | |
| 5,546,992 | 8/1996 | Chick et al. . | |
| 5,654,499 | 8/1997 | Manuli . | |
| 5,744,206 | 4/1998 | Russek et al. | 138/123 |

FOREIGN PATENT DOCUMENTS

96 09487 3/1996 WIPO .

*Primary Examiner*—James F. Hook
*Attorney, Agent, or Firm*—Christie, Parker & Hale, LLP

[57] ABSTRACT

A double containment glass fiber pipe section is formed by a single winding operation. The pipe section may be a pipe or a pipe fitting. A section of primary pipe is wound and wrapped by a plastic tape. A permeable material layer is then wrapped around the wrapped primary section. One or more plastic tape layers are then wrapped over the permeable material layer followed by a winding of the secondary pipe section. The assembly is then cured forming a double containment pipe section having a permeable annulus having a radial thickness of about 1 mm. The permeable annulus is defined by the permeable material between the primary and the secondary sections. The permeable material allows for the flow of fluids within the annulus. A pair of wires may be helically wound within the annular space and can be used to detect leakage from the primary pipe section flowing within the annulus by monitoring changes in the capacitance or the resistance between the wires.

17 Claims, 8 Drawing Sheets

DOUBLE CONTAINMENT PIPE SECTIONS

BACKGROUND OF THE INVENTION

This invention relates to double containment pipes and fittings and to methods for making the same.

Double containment pipelines are in common use for transporting contaminants and toxins underground. They are most commonly used as underground gasoline transporting pipelines.

A double containment pipe is in essence a pipe within a pipe. An inner or primary pipe is the primary carrier of the fluids while the outer or secondary pipe is used to contain any leakage from the primary pipe. An annulus is formed between the pipes. Typically, double containment pipes are formed by slipping a secondary pipe over the primary pipe. The secondary pipe is typically the next largest size after the primary pipe.

Slipping one pipe over the other is a cumbersome, time consuming process in that the primary pipe is formed separately from the secondary pipe and then put together. Moreover, this approach is not conducive to forming double containment pipe sections having curvatures such as double containment fittings. Sometimes the primary pipe is impact damaged before or during the process of being slipped into the secondary pipe. If the primary pipe is made from a composite material, such damage may not be capable of being detected by the human eye. As a result, double containment pipes formed using this method may be undetectably damaged from the onset.

To detect leakage of the primary pipe a sump is generally placed at the lowest point of the pipeline. The sump is typically connected to a lower portion of the annulus formed between the primary and secondary pipe. Any fluid leaked from the primary pipe will travel in the annulus and will collect in the sump. The sump is periodically monitored to determine if there has been leakage. A sensor may be placed in the sump for detecting the accumulation of fluids. A disadvantage with this leak monitoring approach is that it is not instantaneous, i.e., a leak from the primary pipe that is located far enough upstream from the sump would not be detected until the leaked fluid has traveled down the pipeline and into the sump.

During installation and initial inspection of double containment pipes, leakage may be detected by visual inspection of the primary pipe. To accomplish this type of inspection, the secondary pipe is telescoped away from the primary pipe. This is also a time consuming, costly process.

Accordingly, there is needed a method for efficiently manufacturing double containment pipe sections, and a system for rapidly detecting leaks from the primary pipe in a double containment pipe section during initial installation and service.

SUMMARY OF THE INVENTION

A double containment pipeline section is formed wherein the primary pipeline section is separated from the secondary pipeline section by a porous layer. In the preferred embodiment this is a layer of sand. This double containment pipeline section can be either a pipe or a fitting of any geometry. However, for descriptive purposes, reference is only made herein to pipes.

To form a double containment pipe the primary pipe is wound, preferably from materials consisting of glass fibers and preferably epoxy resin. As, or after, a first portion of the primary pipe is wound, it is wrapped with a first plastic tape such as a polyvinyl fluoride, polyethylene or polypropylene tape for forming a layer sealing off the fiber and resin material. A second plastic tape having sand adhered to one of its faces is wrapped over the taped primary pipe so that the sand is sandwiched between the first and second tape layers. A third layer of plastic tape is then wrapped around the second tape layer. Additional plastic tape layers may also be wrapped around the third tape layer. A secondary pipe is then wound over the taped primary pipe portion using a material, preferably consisting of glass fibers and epoxy resin. This process is continuous until the complete double containment pipe is wound. The wound double containment pipe is then cured.

The dry sand serves as a spacer between the primary and secondary pipes. It defines a permeable annulus between the pipes. Since sand is a granular material, it does not restrict any leakage from the primary pipe from flowing within the annulus. The sand is adhered to the second plastic tape by having the tape with tacky adhesive on one of its faces pulled through a container of sand.

In an alternate embodiment, the primary pipe section may be partially cured prior to the wrapping of the tape layers and winding of the secondary pipe. In a further embodiment, the plastic tape having sand adhered to it is wrapped over an existing pipe followed by the wrapping of the other layers of plastic tape and the winding of the secondary pipe.

In another embodiment, a woven or non-woven mesh, preferably in tape form is wrapped around the primary pipe and serves as a spacer for forming the annulus between the primary and secondary pipes. The mesh may be made from conductive or non-conductive fibers or wires. With this embodiment, a plastic tape layer is wrapped over the primary pipe prior to the wrapping of the mesh, if the primary pipe is in a wet condition. A plastic tape layer is wrapped over the mesh prior to the winding of the secondary pipe.

In yet a further embodiment, two wires may be helically wound within the annulus. In another embodiment, after winding the two wires, a release layer is wrapped over the wires, which is followed by a wrapping of a one or more layers of plastic tape and the winding of the secondary pipe. The release layer allows for the creation of an annular leakage path between the primary and the secondary pipe.

By being helically wound, the two wires would be exposed to any leakage from the primary pipe flowing into the annulus. When the leaked fluid comes into contact with both wires, the inductance, i.e., the capacitance or resistance between the wires changes. Therefore, leakage of the primary pipe section may be detected by monitoring for shifts in the resistance or capacitance of these wires.

DETAILED DESCRIPTION

Figure 1:
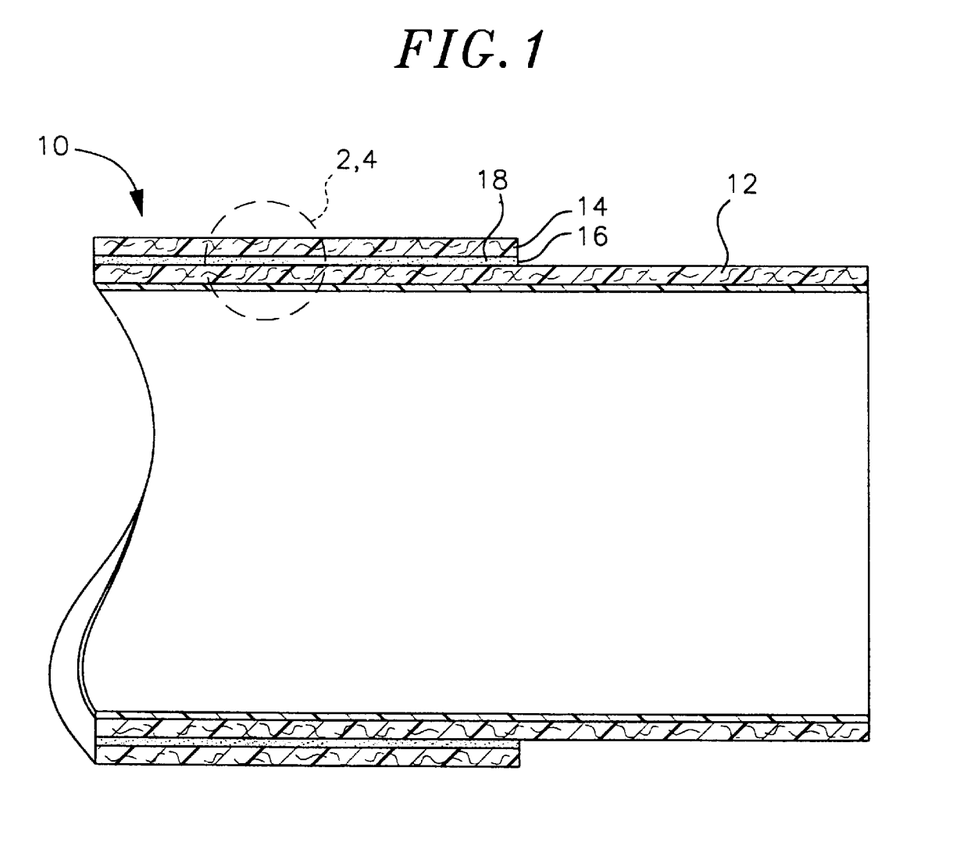
FIG. 1 is a cross sectional view of a double containment pipe having sand defining the annulus between the primary and secondary pipes.
Figure 5:
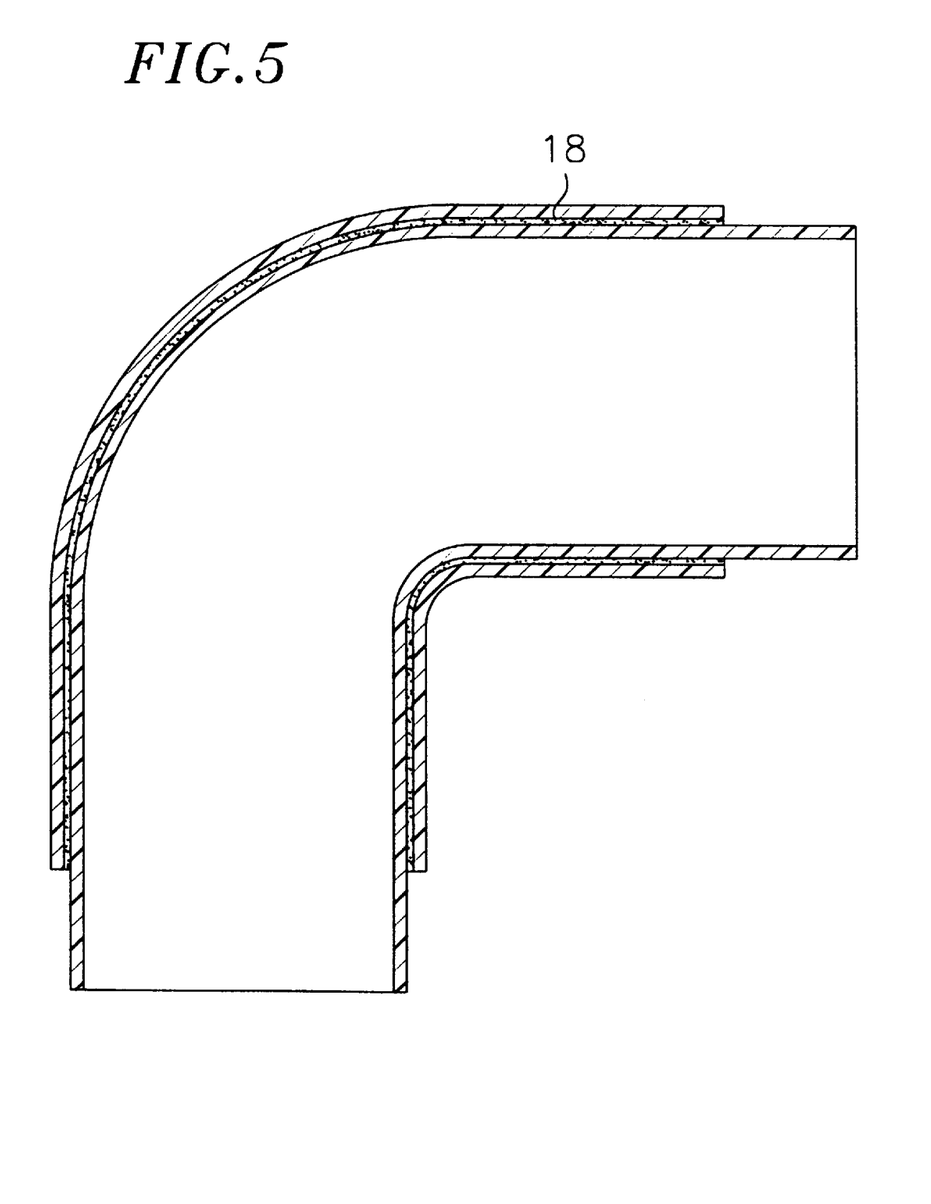
FIG. 5 is a cross sectional view of a double containment pipe elbow fitting having sand defining the annulus between primary and secondary elbow fittings.

Double containment pipeline sections 10 are used to form a pipeline. A typical double containment pipeline section contains a primary pipeline section 12 within a secondary pipeline section 14 (FIG. 1). The purpose of the secondary pipeline section is to contain any leakage from the primary pipeline section and to assist in the detection of such leakage. These pipeline sections can be pipe fittings (FIG. 5) or sections of pipe (FIG. 1). They are ordinarily rigid, but may be flexible. For illustrative purposes, these double containment pipeline sections are described herein in terms of pipes.

In a first embodiment, the double containment pipe has a primary pipe within a secondary pipe. An annulus 16 is formed between the primary and secondary pipes. Preferably, the radial thickness of the annulus is about one millimeter. The annulus contains a permeable layer preferably formed from a granular material such as sand 18. The granular material serves as a spacer between the primary and secondary pipes and defines the annulus. Since the granular material forms a permeable layer, it allows for the flow within the annulus of any leaks from the primary pipe.

Figure 2:
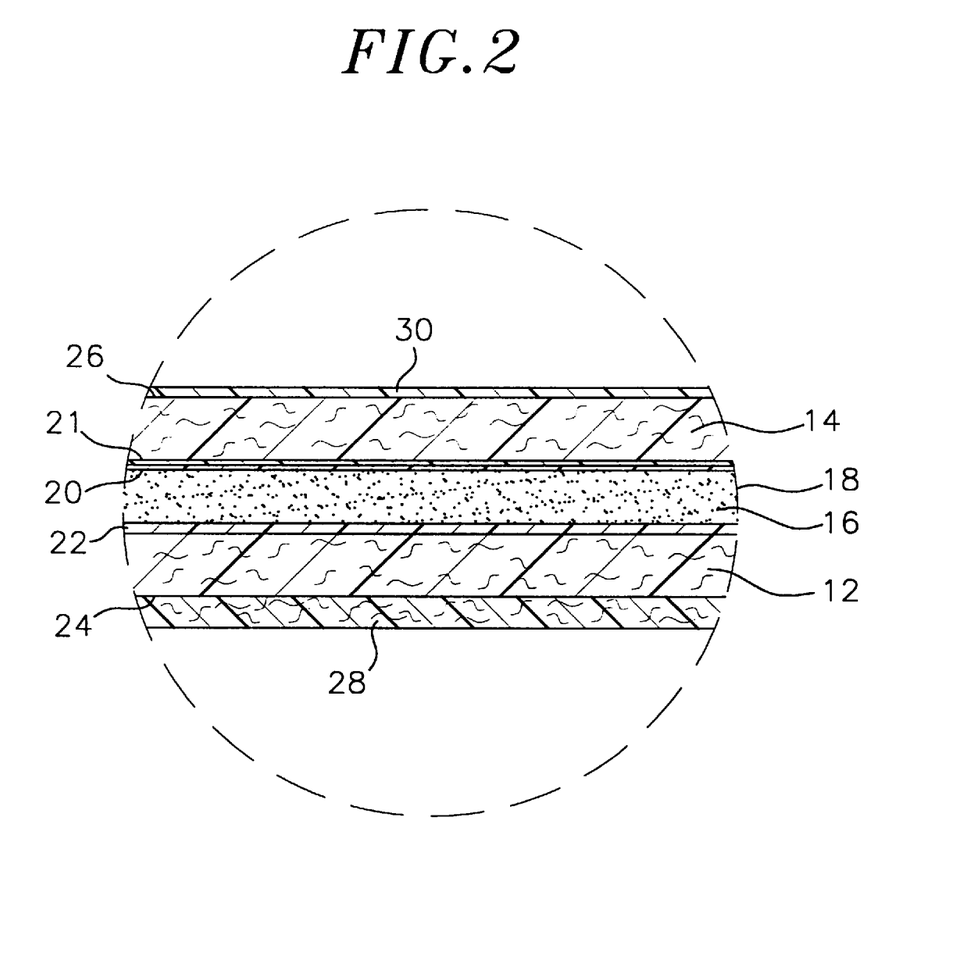
FIG. 2 is an expanded cross sectional view of a section of the double containment pipe shown in FIG. 1.

To form this double containment pipe, a primary pipe is wrapped with a plastic tape 20 having a layer of sand 18 on one of its faces (FIG. 2). The tape is preferably made from polyvinyl fluoride "PVF", polyethylene "PE", or polypropylene "PP". The tape has a tacky adhesive on one of its faces. A layer of sand is applied on the face of the tape having the adhesive, preferably by pulling the tape through a container of sand. The tape is then wrapped around the primary pipe such that the sand is sandwiched between the outer surface of the primary pipe and the plastic tape on to which it is adhered. A second tape layer 21 is then wrapped around the taped primary pipe. The secondary pipe is then wound over the taped primary pipe. Typically, this is accomplished by winding layers of glass fibers embedded in resin, preferably epoxy, over the taped primary pipe. The second plastic tape layer prevents the permeation of the resin into the annulus occupied by the layer of sand. Such permeation would result in blockage of the annulus. The second plastic layers also prevents air from getting into the secondary pipe during curing. The wound secondary pipe is then cured forming the double containment pipe.

In a further embodiment, the primary pipe is formed by winding glass fibers embedded in preferably epoxy resin and is partially cured prior to the wrapping of the tape layers and the winding of the secondary pipe.

In an alternative embodiment, the first tape layer is wrapped around the primary section with the sand facing away from the primary pipe. A second and preferably a third tape layer are then wrapped over the exposed sand followed by a winding of the secondary pipe.

In a further embodiment, a primary pipe is wound preferably from material consisting of glass fibers and preferably epoxy resin. The uncured wet primary pipe is then wrapped with a first plastic tape 22 such as a PVF, PE, or PP tape forming a layer for sealing off the fiber and resin material. A second plastic tape having sand adhered to one of its faces, as described above, is then wrapped over the taped primary pipe. Third and preferably fourth layers (shown collectively as layer 21 in FIG. 2) of plastic tape are then wrapped around the second tape layer. The secondary pipe is then wound over the taped primary pipe using a material preferably consisting of glass fibers and epoxy. The assembly consisting of the primary pipe and the secondary pipe is then cured to form the double containment pipe. Again, the sand serves as a spacer between the primary and the secondary pipes forming an annulus, while the tape layers prevents the epoxy from penetrating into the annulus and air from the annulus from penetrating the wet, uncured pipes. With this embodiment, the formed primary pipe is always covered by the secondary pipe and thus is protected from impact damage.

While in the preferred embodiment, the permeable layer is formed by a granular material such as sand, other permeable materials may also be used. For example, instead of using a tape having sand adhered to one of its faces, a mesh material such as a copper mesh or cloth may be used. The mesh used may be woven or non-woven and may be formed from conductive or non-conductive wires or fibers. With these embodiments, the annulus 18 of the double containment pipe will contain the mesh material.

The mesh may be preferably in tape form to allow for wrapping around the primary pipe, especially in a continuous manufacturing process. If the primary pipe is in a wet condition (i.e., not cured) a plastic tape layer is wrapped around the primary pipe prior to the wrapping of the mesh. Similarly, a plastic tape layer is wrapped over the mesh prior to the winding of the secondary pipe. The plastic tape layers create a seal for preventing resin from penetrating the mesh, and air from the mesh from penetrating the resin.

The embodiments described herein can be easily incorporated into current pipe manufacturing systems which form a pipe sections by winding glass fibers embedded in resin. Similarly, these embodiment may be incorporated in manufacturing systems which manufacture a continuous section of pipe by laying longitudinal glass fibers embedded in resin which are wrapped with other glass fibers embedded in resin. Incorporation of these embodiment may be accomplished by adding extra steps to these manufacturing systems to wrap the plastic layers, with or without sand, or the mesh and to wind the secondary pipe.

For example, in the preferred embodiment, the double containment pipe is wound in a continuous process. As a first portion of the primary pipe 12 is continuously wound using preferably glass fibers embedded in epoxy resin and partially cured, it is wrapped with a first plastic tape 20 having sand 18 adhered to one of its faces so that the sand is sandwiched between the primary pipe and the first plastic tape. Additional layers of plastic tape may be wrapped over the first tape. Finally, the secondary pipe 14 is wound, preferably from material consisting of glass fibers embedded in epoxy resin. The process continues until the complete double containment pipe is formed. The section is then cured.

Although the preferred resin for forming either the primary or secondary pipe is epoxy, other resin systems such as polyester, vinyl ester, phenolic, or furan may also be used.

The inner surface 24 of the primary pipe and the outer surface 26 of the secondary pipe may be coated with protective coatings 28, 30 for protection against the environments to which they are exposed.

Figure 3:
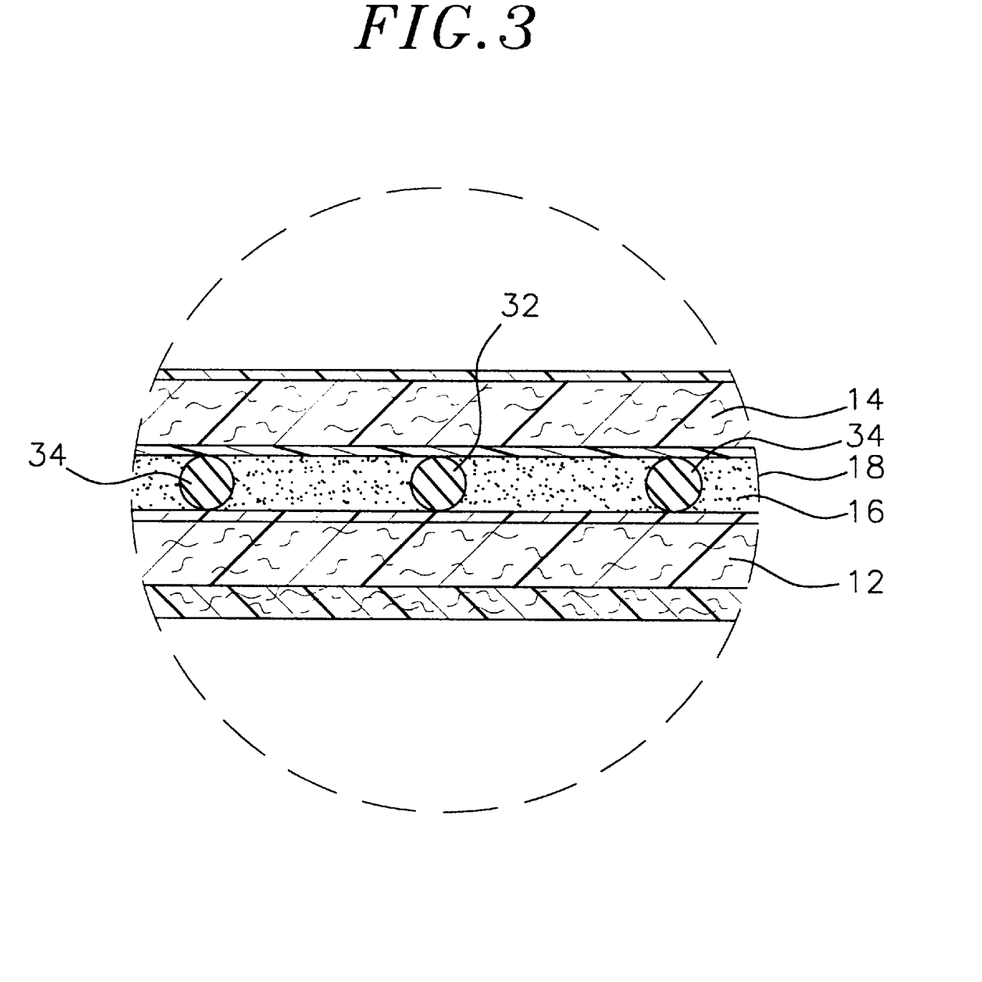
FIG. 3 is an expanded cross sectional view of the double containment pipe shown in FIG. 1 and having wires helically wound around the primary pipe in the annulus.
Figure 4:
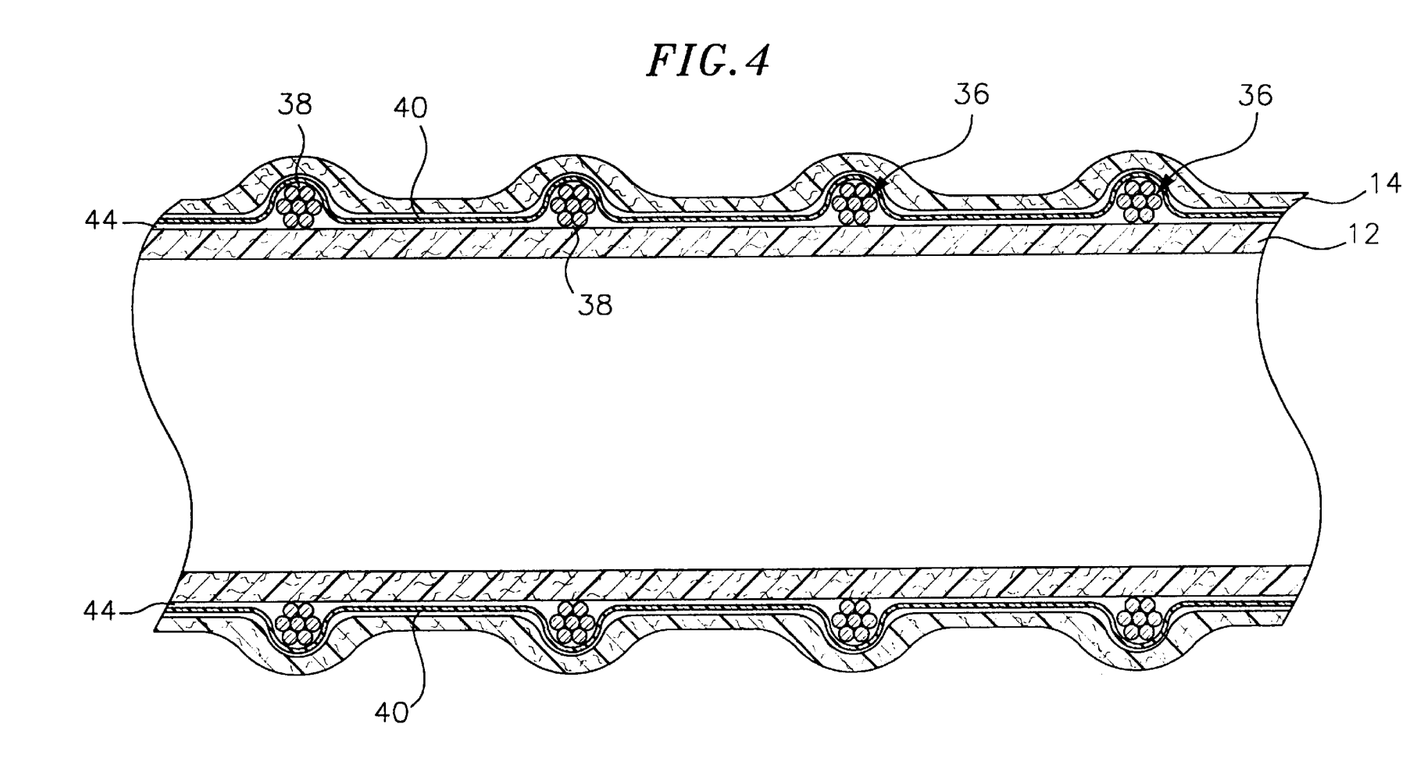
FIG. 4 is a cross sectional view of a double containment pipe having a release layer between the primary and secondary pipes and cables helically wound around the primary pipe for the purpose of detecting leakage of the primary pipe.

In another embodiment, a pair of wires 32 are helically wound around the primary pipe so as to be located within the annulus (FIG. 3). Instead of plain wires, twisted wires or cables 36 may also be used (FIG. 4). As it would become apparent to one skilled in the art, the crevices 38 on the outer surfaces of the cables or which are defined in the surfaces between twisted wires, provide an additional path for fluid flow along the wires. This is beneficial in cases where the annulus between the primary and secondary pipes may get blocked. For descriptive purposes, however, reference is made herein only to wires.

These wires are spaced apart from each other. Since the radial thickness of the annulus is very small (typically in the order of about 1 mm or less), a small amount of leakage from the primary pipe will fill the annulus, or would at least fill a lower portion of the annulus. Since the wires are helically wound around the pipe, they are bound to come in contact with fluids leaking and collected in the annulus. As the fluid comes in contact with the two wires it causes a change in the impedance between the wires, i.e., the resistance and the capacitance between the wires. Therefore, leakage of the primary pipe can be detected by monitoring for changes, beyond a predetermined level, in the resistance or the capacitance between the wires.

To monitor the impedance between the wires, the leads of an impedance detector (e.g., a capacitance detector or ohmmeter) are electrically connected to the wires within the double containment pipe, preferably at the junction between consecutive double containment pipes. By electrically connecting corresponding wires between consecutive double containment pipes, the number of locations for measuring the impedance between the wires can be minimized.

The wires may also be wound in a continuous forming process. For example, the wire winding step may be added prior to the wrapping of the primary pipe with the tape having the sand adhered to it in cases where such tape is wound with the sand on the inside. In this regard, the wires will be positioned with the annulus defined by the sand layer.

In yet another embodiment, instead of wrapping the inner pipe with tape having sand adhered to it, a pair of spaced apart wires (twisted wires or cables) are wound around the inner pipe. A release film 40 is then wrapped over the wires and inner pipe. As with the previous embodiments, one or more layers of plastic tape are then wound over the release film followed by a winding of the secondary pipe.

The release film prevents the bonding of the secondary pipe onto the primary pipe and thereby allows for the creation of an annular leak path 44 between the primary and secondary pipes. This leak path is not very voluminous and thereby, fills up relatively quickly when the primary pipe leaks. Again, leakage of the primary pipe may be detected by monitoring for shifts in the resistance or the capacitance of the wires.

The advantage of any of the aforementioned embodiments is that a double containment pipe can be formed having a very small annulus volume for accommodating the flow of fluid leaked from the primary pipe. This is accomplished by forming a double containment pipe having a very thin annulus, typically in the order of 1 mm or less. The material filling up the annulus preferably occupies at least 50% of the annulus. As such, less than 50% of the thin annulus volume is available to accommodate fluids. Consequently, leakage from the primary pipe fills up the annulus rapidly and allows for immediate detection of such leakage by monitoring the annulus.

The double containment pipes formed by any of the aforementioned embodiments can be easily checked for leakage before or after installation into an operating pipeline. To check for leakage, liquid soap is used at the ends of the secondary pipe bridging the annulus between the primary and secondary pipes. Since the annulus is relatively thin, the liquid soap can easily bridge the annulus. The primary pipe is then pressurized to about 100 psi, preferably using gas, and the liquid soap bridging the annulus is checked for bubbles. Bubbles are indicative of leakage. Due to the small volume in the annulus available for fluid flow, very small leaks are immediately detected. As such, the primary pipe can be checked for leakage without having to telescope the secondary pipe.

Figure 6:
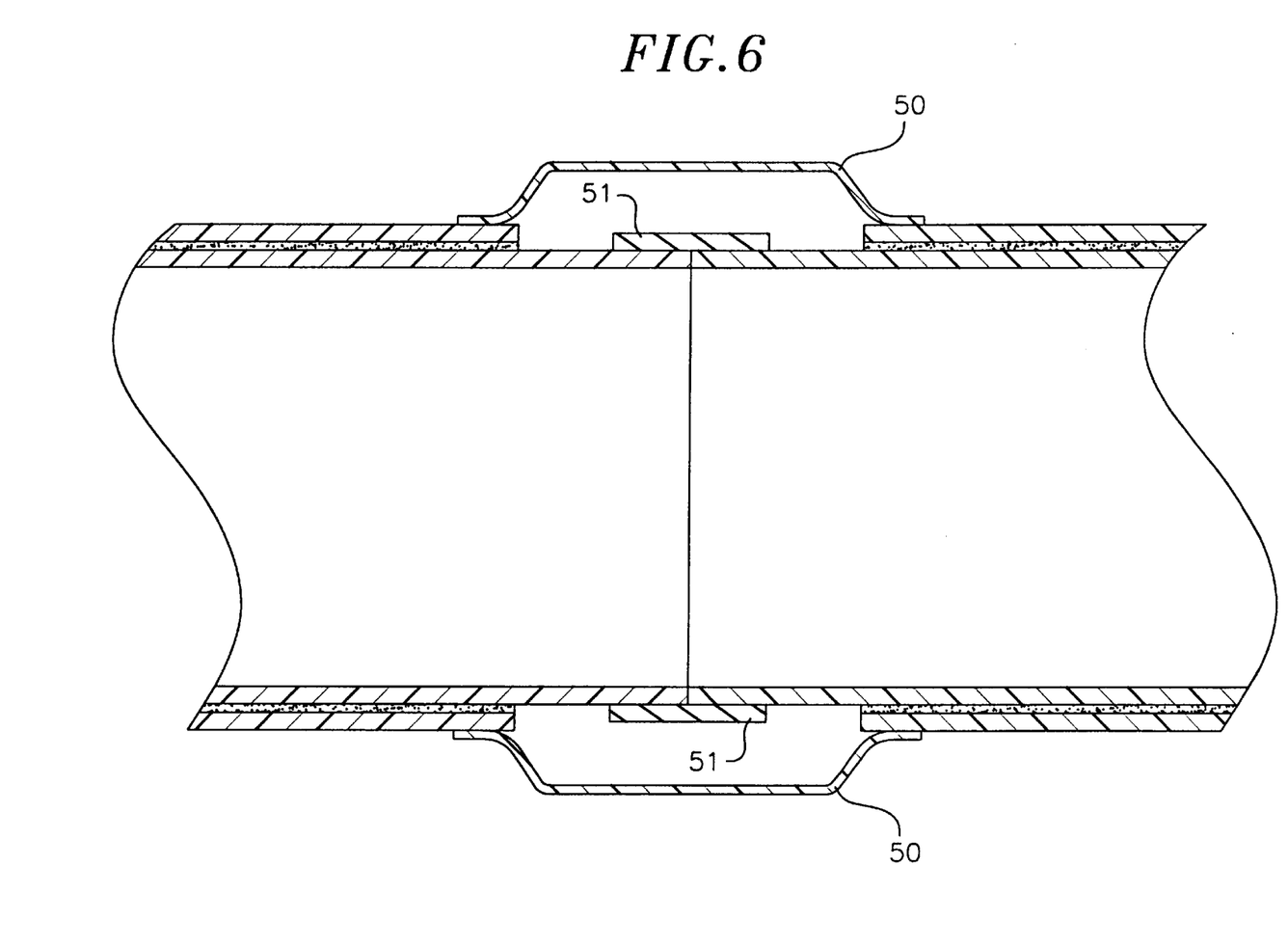
FIG. 6 is a cross sectional view of a double containment pipeline formed by connecting two double containment pipes by bonding their primary pipes and coupling their secondary pipes using a rubber boot.
Figure 7:
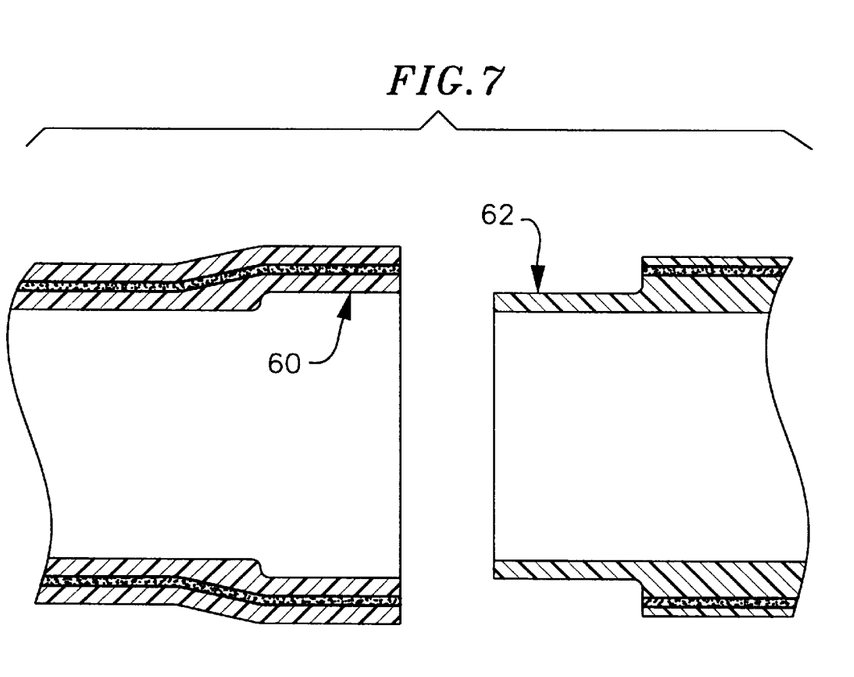
FIG. 7 is a cross sectional view of a double containment pipe having an end forming a socket and of a double containment pipe having end forming a spigot which is complementary to the socket.
Figure 8:
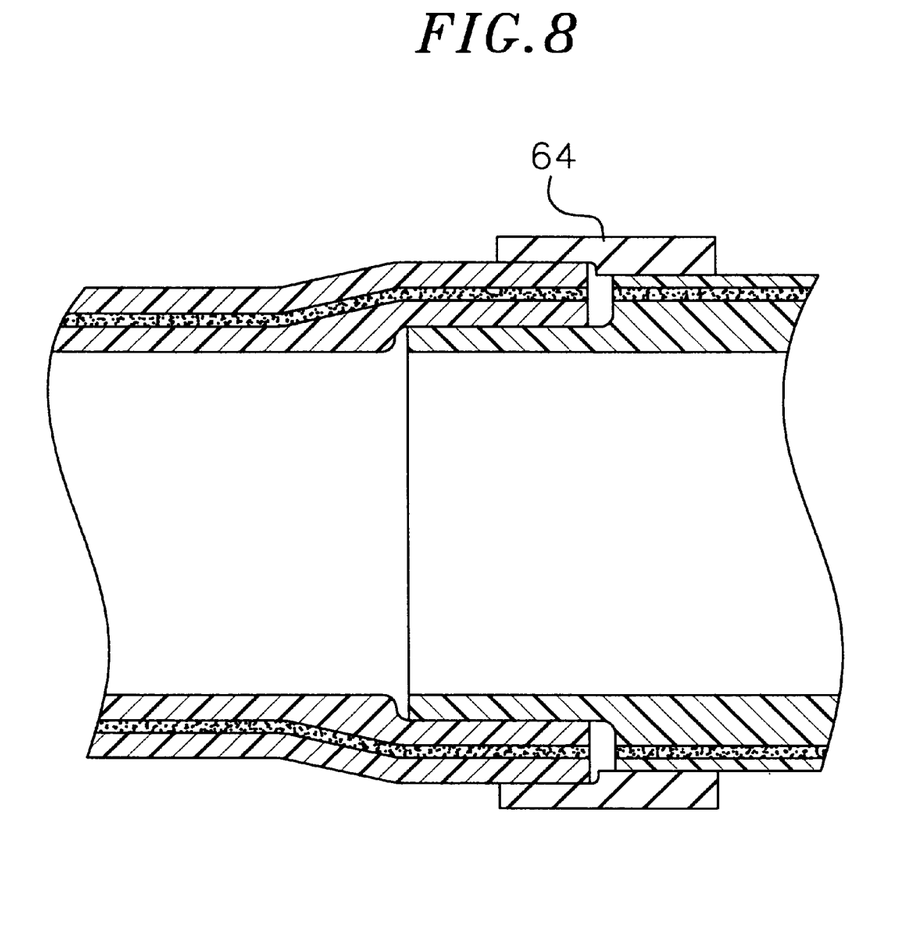
FIG. 8 is a cross sectional view of the double containment pipes shown in FIG. 7 bonded to each other forming a double containment pipeline.

The pipeline sections described herein, whether pipe fittings or pipe sections, can be connected together using methods and couplers which are known in the art. To facilitate connection of the primary pipes, it is necessary to have the primary pipes extend beyond the secondary pipes. The primary pipes can be connected by bonding them to a conventional coupling 51 (FIG. 6). Rubber boots 50 can be bonded or mechanically attached to the outer surfaces of the secondary pipes. The boots can be easily removed to check for leakage from the primary pipe. Instead of rubber boots, clamshell type fittings (not shown) or couplings made from glass fibers embedded in resin (not shown) can be bonded to the outer surfaces of the secondary pipes. It is preferred, however, that one end of a pipe to be joined forms a socket 60 (FIG. 7) and the end of the other pipe or fitting, to which it will joined forms a spigot 62 which is complementary to the socket. To form the socket the inner surface of the primary pipe near the pipe end is stepped up to a larger diameter. To form the spigot, the primary pipe is extended beyond the end of its corresponding secondary pipe and its outside diameter is stepped down. To join the pipes, the spigot end of one pipe is slid into and bonded to the socket end of the other (FIG. 8). A coupling made from glass fibers embedded in resin 64, a rubber boot (not shown) or clamshell (not shown) is used to bridge the gap between the outer surface of each of the secondary pipes.

Although this invention has been described in certain specific embodiments, many additional modifications and variations will be apparent to those skilled in the art. It is, therefore, understood that within the scope of the appended claims, this invention may be practiced otherwise than specifically described. For example, instead of pulling the tape with the tacky adhesive on one of its faces through a container of sand, the sand may be sprinkled onto the face with the tacky adhesive adhering the sand to that face. Similarly the tape with the tacky adhesive may be wrapped around the primary pipe with the tacky adhesive on the outside. The sand is then sprinkled onto the wrapped pipe adhering to the tacky adhesive.

What is claimed is:

1. A double containment pipeline section comprising:
   a secondary pipeline section having an inner surface;
   a primary pipeline section, the primary pipeline section formed within the secondary pipeline section;
   an annulus, having a volume, formed between the primary and secondary pipeline sections, the annulus having an inner and an outer surface; and
   a granular material forming a permeable layer between the inner and outer surfaces of the annulus, wherein the granular material comprises particles wherein a majority of said particles are in contact with the same surface of the annulus.

2. A double containment pipeline section as recited in claim 1 wherein the primary pipeline section is a pipe fitting.

3. A double containment pipeline section as recited in claim 1 wherein the primary pipeline section is a pipe.

4. A double containment pipeline section as recited in claim 1 wherein the granular material is sand.

5. A double containment pipeline section as recited in claim 1 further comprising a sealing layer lining the outer surface of the primary pipeline section.

6. A double containment pipeline section as recited in claim 1 comprising a sealing layer lining the inner surface of the secondary pipeline section.

7. A double containment pipeline section as recited in claim 1 further comprising two spaced apart conductive media within the inner and outer surfaces.

8. A double containment pipeline section as recited in claim 7 wherein the two conductive media are wires wound around the outer surface of the primary pipeline section.

9. A double containment pipeline section as recited in claim 1 wherein the annulus has a radial thickness not exceeding 1 mm.

10. A double containment pipeline section as recited in claim 9 wherein less than 50% of the annulus volume is permeable.

11. A double containment pipeline section as recited in claim 1 wherein a majority of the particles are adhered to the inner surface of the annulus.

12. A double containment pipeline section as recited in claim 1 wherein a majority of the particles are adhered to the outer surface of the annulus.

13. A double containment pipeline section as recited in claim 1 wherein the annulus comprises a single layer of particles.

14. A double containment pipeline section as recited in claim 1 wherein a majority of the particles are in contact with both surfaces of the annulus.

15. A double containment pipeline section as recited in claim 1 wherein the primary and secondary pipeline sections comprise fluid tight walls.

16. A double containment pipeline section comprising:

a secondary pipeline section having a fluid tight wall;

a primary pipeline section having a fluid tight wall, the primary pipeline section formed within the secondary pipeline section;

an annulus formed between the primary and secondary pipeline sections having a radial thickness not exceeding 1 mm and a volume; and a granular material forming a permeable layer in the annulus.

17. A double containment pipeline section as recited in claim 16 wherein less than 50% of the annulus volume is permeable.

* * * * *